Oct. 1, 1968        A. WINSEL        3,404,038
ELECTROCHEMICAL CELL, PARTICULARLY FUEL CELL, AND
GAS-DIFFUSION ELECTRODES THEREFOR
Filed Aug. 27, 1962        4 Sheets-Sheet 4

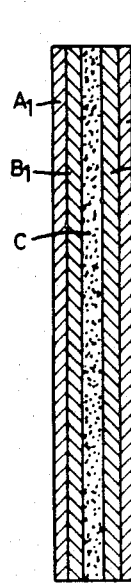
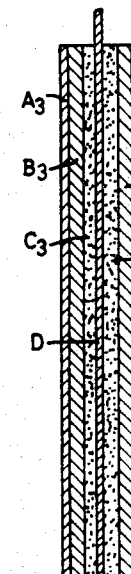
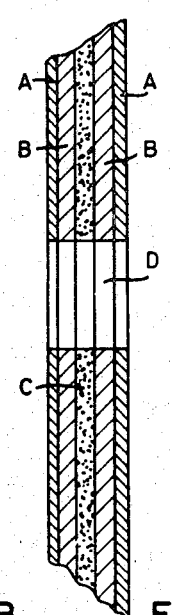
FIG. 1A  FIG. 1B  FIG. 2A
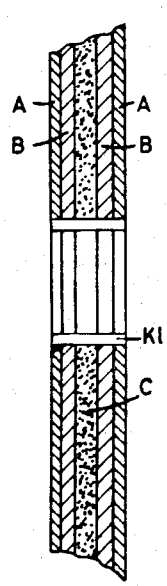
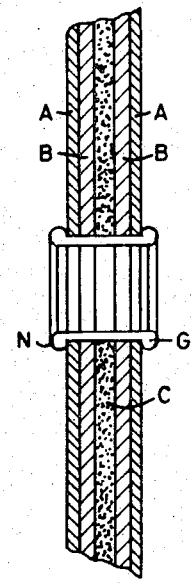
FIG. 2B  FIG. 2C  FIG. 2D

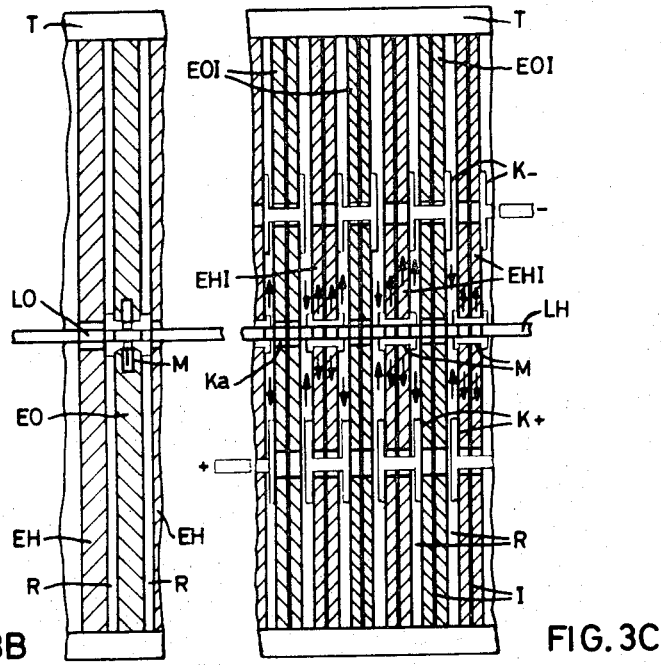
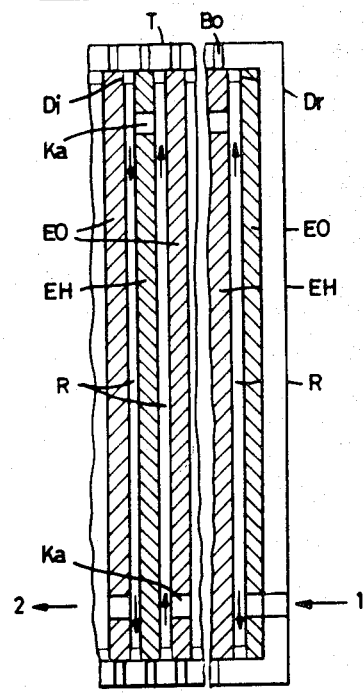

United States Patent Office 3,404,038
Patented Oct. 1, 1968

3,404,038
ELECTROCHEMICAL CELL, PARTICULARLY FUEL CELL, AND GAS-DIFFUSION ELECTRODES THEREFOR
August Winsel, Braunschweig, Germany, assignor of one-half to Siemens Aktiengesellschaft, Berlin, and one-half to Varta Aktiengesellschaft, Frankfurt am Main, Germany, both corporations of Germany
Filed Aug. 27, 1962, Ser. No. 219,681
Claims priority, application Germany, Aug. 30, 1961, S 38,213
6 Claims. (Cl. 136—86)

My invention relates to electro-chemical cells, particularly fuel elements and batteries, and to gas-diffusion electrodes for use in such cells. As a rule, such electrodes have the shape of a plate with two planar, preferably parallel, surfaces.

In its simplest form, a gas-diffusion electrode is a porous body disposed as a diaphragm-like partition between two spaces of which one contains the electrolyte and the counter electrode, and the other space is filled with the reaction gas. The gas is under some pressure sufficient for overcoming the capillary pressure at which the electrolyte tends to penetrate into the pores of the electrode. The three-phase boundary, required for electrochemical conversion of the gas, adjusts itself between the electrode, electrolyte and gas.

By providing fine pores on the electrode side and coarse pores on the gas side of the electrode body, the escape of gas in form of small bubbles through the electrode into the electrolyte can be prevented, not withstanding the higher gas pressure. For this purpose, the electrode is composed of two layers, of which the fine-porous cover layer faces the electrolyte, and the coarse-porous active layer is located on the side of the gas space. The pressure of the gas is so chosen that the three-phase boundary becomes established in the junction surface or zone of the two layers. For further details concerning the construction and operation of gas-diffusion electrodes, reference may be had to the paper by E. Justi, M. Pilkuhn, W. Scheibe and A. Winsel, "Hochbelastbare Wasserstoff-Diffusions-Elektrode fur Betrieb bei Umgebungstemperatur und Niederdruck," Abb. d. Math.-Nat. Kl. d. Akad. d. Wiss. u. Lit. Mainz 8, 1959, Komm. Verlag Steiner, Wiesbaden (Hydrogen-Diffusion Electrode of High Loadability for Operation at Ambient Temperature and Low Pressure, published 1959 by Steiner, Wiesbaden, Germany).

Due to the diaphragm-type load by the gas pressure, such electrodes are subjected to high mechanical forces. Since the electrode area increases with the square of the electrode radius, the pressure forces on the electrode also increases with the square of the radius. For sufficient mechanical strength, therefore, an increase in electrode surface must be accompanied by an increase in thickness of the electrode, which in many cases is undesirable.

The invention will be described herein with reference to the accompanying drawing in which:

FIGS. 1a and 1b are explanatory and show, for comparison, sectional views of two respective electrodes developed prior to the present invention.

FIGS. 2a to 2d are partial and sectional views of four respective electrodes according to the invention.

FIGS. 3a to 3c are partial and sectional views of three respective electro-chemical cells according to the invention.

Figure 4A:
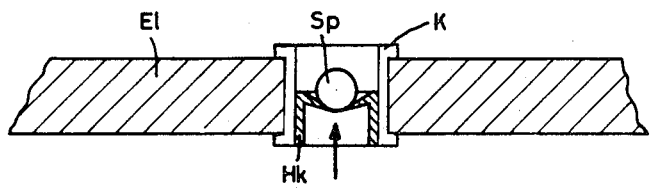
FIGS. 4a to 4c show three devices allowing to intermittently open the apertures or openings for intermittent electrolyte flow control.

It has been proposed to minimize these difficulties by designing the electrodes in twin fashion as so-called "Janus electrodes." In a Janus electrode, two electrodes of the above-described design have their gas-permeable faces baked together, preferably with a porous gas-conducting layer interposed. Such an electrode is schematically illustrated in FIG. 1a of the accompanying drawings. Apparent from the sectional view are the two cover layers $A_1$ and $A_2$, the active layers $B_1$ and $B_2$, as well as the intermediate gas-conducting layer C. Since in each partial region of the electrode the occurring pressure forces are balanced by counter forces, a Janus electrode is not subjected to diaphragm loading. Such electrodes operate on both sides by supplying current to the adjacent electrolyte. If one subdivides the gas conducting layer $C_3$–$C_4$ according to FIG. 1b by an impermeable metal layer D and forms the cover layer $A_3$ and the active layer $B_3$ for hydrogen, the cover layer $A_4$ and the active layer $B_4$ for oxygen, then a bi-polar type of a gas-diffusion electrode is obtained. Such electrodes with interposed electrolyte layers afford a particularly simple design of series-connected $H_2$–$O_2$ fuel elements. The electrolyte layers are galvanically separated, i.e. electrically insulated, from each other in order to prevent shunt-circuit currents.

In practice, the gas-diffusion electrodes must be designed in adaptation to the necessary connections of gas conduits, electric conductors and an electrolyte circulation system. For example, in fuel elements the active layers of the electrodes must be continuously supplied with fuel gas and oxygen. The electrolyte circulation from which, for example, in $H_2$–$O_2$ elements, the reaction water must be continuously removed, must take place in the interstitial space of the electrodes amounting to only a few millimeters. The electrical contacts, the gas inlet and outlet lines, and the ducts for the electrolyte circulation are usually arranged near the periphery of the electrodes.

These requirements or desiderata entail considerable difficulties unless one resorts to the expedient to make the electrodes thicker and the spacings larger than necessary, only for properly accommodating the electrical and other connections. This however results in other serious disadvantages. Thicker electrodes entail an excessively great weight and space requirement; and larger than the electrically necessary electrode spacings result in a too high electrolyte resistance and hence to corresponding energy losses under load conditions.

It is an object of my invention to avoid the described disadvantages and to greatly simplify the design of the electrodes with respect to the various connections.

To this end and in accordance with a feature of my invention, the electrodes are provided with one or more hermetically sealed openings which extend transversely through the electrode body between the two electrode surfaces. The openings are preferably given a circular cross section. They extend either perpendicularly to the electrode surface or at some angular relation thereto. The walls of the openings are preferably sealed with rubber, synthetic material or other hermetical sealing substance. The seal may also consist of a gas-tight sleeve snugly inserted into the openings.

In principle, the invention is applicable with the above-described simplest form of gas-diffusion electrodes if care is taken that the openings, which may be traversed, for example, by conduits for the electrolyte circulation or which may themselves constitute ducts for the electrolyte, are tightly sealed from the gas space. For this purpose the above-mentioned sealing sleeve in the openings can be so designed that they seal the inner cylindrical wall of the opening as well as the open cross section around the electrolyte line that passes through the opening.

My invention is of particular importance in conjunction with Janus electrodes having an interposed gas-conducting layer. The sealing means for the wall opening in each electrode can be interrupted at the location of the gas-conducting layer for the purpose of forming a communication between the porous gas-conducting layer and a gas pipe entering into the electrode opening.

According to another feature of my invention, the above-mentioned openings in the electrodes are also employed as ducts for the electrolyte circulation and for receiving electric conductors for connecting the individual electrodes. According to a further feature of my invention, the openings in the electrodes, as well as the electric conductors, gas conduits and electrolyte ducts passing through, or constituted by, the openings are all located in the middle area of the electrodes remote from their marginal zones so that the marginal zones remain free of any gas-electrolyte or electrical connections.

The above-mentioned and further objects, advantages and features of my invention, said features being set forth with particularity in the claims annexed hereto, will be apparent from and will be described in, the following with reference to the embodiments of electrodes and fuel cells according to the invention illustrated by way of example in FIG. 2a to FIG. 3c.

Gas-diffusion electrodes are produced in most cases by sintering or hot-pressing of the pulverulent starting materials. The openings can be produced during the pressing operation or also after the electrodes are given their ultimate shape. In this manner, for example, a Janus electrode according to FIG. 2a can be obtained, the electrode comprising the cover layers A, the active layers B, the intermediate gas-conducting layer C and the bore or cylindrical opening D. In this condition, gas could escape from the gas-conducting layer C into the opening D. For providing a gas-tight seal of the opening D, the cylindrical wall of the opening can be provided according to FIG. 2b with hardenable synthetic adhesive substance as shown at K1. Suitable, for example are any of the epoxy resins such as synthetic resinous sealing compound available in the trade under the name Araldite. (See page 355 of "Polymers & Resins" by Golding, published by Von Nostrand Co., Princeton, N.J., 1959.) These sealing materials wet the electrode and penetrate into the pores thus clogging and sealing the pores in the vicinity of the opening. According to another embodiment shown in FIG. 2c, a sleeve K of thermo-plastic synthetic material is inserted into the opening and is given the necessary shape and sealing fit under pressure at elevated temperature.

Also applicable is a plastic sealing material such as rubber, as shown at G in FIG. 2d. Such material can be forced upon the cylindrical wall of the opening by means of a sleeve N in form of a hollow rivet.

The use of electrodes according to the invention in electro-chemical cells and the advantages obtainable thereby will be explained with reference to the embodiments according to FIGS. 3a to 3c. It will be understood that there are many other possibilities of application requiring an analogous modification of the designs illustrated.

FIGS. 3a to 3c relate to an electro-chemical cell with Janus electrode for oxygen EO and for hydrogen EH which are electrically connected in parallel relation to each other. For simplicity, the inner layer of the electrodes is not shown in FIG. 3a. The electrodes are mounted in a tank T which is connected through bores Bo to gas inlet and outlet means. The electrodes are sealed against the tank walls around the perimeter of the electrodes by means of rubber-like gaskets $D_i$, preferably located between washer rings, which are pressed against the cover layers of the two adjacent electrodes and against the inner wall of the tank T when the electrodes are pressed together. The electrodes are provided with gas-tightly sealed openings according to the invention, as described above. In the example of FIG. 3a, the openings $K_a$ of successive electrodes are alternately located near the top and near the bottom respectively, and the openings form ducts for the electrolytes so as to establish a meander path for the electrolyte circulation which flows from the inlet 1 to the outlet location 2, as indicated by arrows, through the electrolyte spaces R. The electric connections between the electrodes as well as the gas conduits which are not shown in this illustration, are arranged in the marginal zone of the electrodes in this particular example.

The supply and/or discharge of gas through the openings in the electrodes is schematically indicated in FIG. 3b. The gas line LO, shown only for the supply of oxygen, is gas-tightly inserted by means of a sealing sleeve M into the opening of the oxygen electrode EO. At the location of the gas-conducting intermediate layer of the electrode, one or more radial openings are provided in the gas line through which the gas flows into the conducting layer. The radially protruding shoulder portions of the sealing sleeve M provide for a gas-tight seal of these radial bores at the oxygen electrode. The same gas supply means and sealing means are employed for the supply of hydrogen to the corresponding electrodes (not shown).

In the embodiment of FIG. 3c, all gas connections, electrolyte ducts and electrical connections are located in the middle range of the electrodes. The electrodes are of the Janus type each comprising two portions of identical design separated from each other by an insulating layer I. The gas-conducting layer extends on both sides of the insulating partition. In this manner an electric insulation between the two surfaces of the electrode is obtained. In order to distinguish these electrodes from those described above, they are denoted in FIG. 3c by EHI (hydrogen electrode) and EOI (oxygen electrode).

The gas is supplied through a centrally located gas line, such as the hydrogen line LH in FIG. 3c, which passes through the electrode openings in the centers thereof and is sealed in the openings by means of respective sealing sleeves M. The resulting gas flow in the electrodes is from the center outwardly, as indicated by arrows. The oxygen supply is effected by an analogous means (not illustrated).

All of the electrode bores shown in FIG. 3c are suitably sealed on their respective walls. Consequently the openings where the fuel gas line LH passes through the oxygen electrodes EOI and where the oxygen lines pass through the hydrogen electrodes EHI, can also be simultaneously employed for the electrolyte circulation. The electrolyte thus passes through the spaces between the electrodes in the directions indicated by arrows.

Since the surfaces of the electrodes are electrically insulated from each other, the surface of a hydrogen electrode can be connected with the corresponding surface of the adjacent oxygen electrode by means of contact pieces $K_+$, $K_-$. The poles of the battery thus resulting are denoted by + and —.

The openings for the electrolyte circulation cause a slight shunt current which constitutes an energy loss. However, the transported electric charge, or the average shunt current per unit of time, can be reduced to negligibly small values in the order of milliamps by providing the electrolyte ducts with valves such as simple flaps which normally keep the electrolyte openings in the electrodes closed. The electrolyte circulation can then be effected intermittently by impact pressure. The valve flaps then open against spring pressure or by suitable cam or tappet control means only in the short intervals in which an electrolyte feed motion is effected.

Figure 4B:
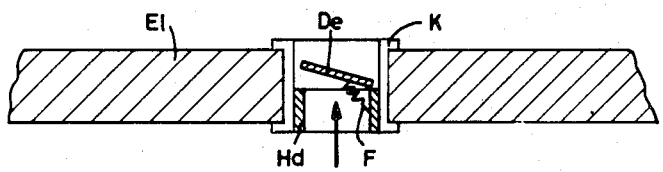
Figure 4C:
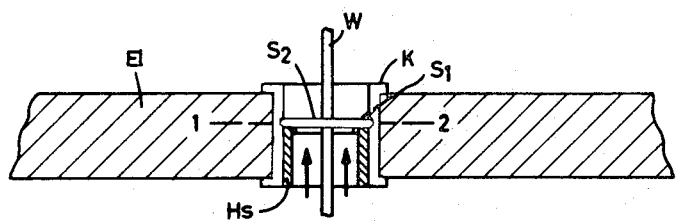

FIGS. 4a, 4b and 4c illustrate three devices which, in accordance with the present invention allow the apertures or openings to be opened intermittently for intermittent electrolyte flow control. FIG. 4a shows a schematic illustration of a ball valve provided within the aperture of electrode E*l*, with the aperture being sealed by means of a sleeve K made of plastic material. H*k* is the cylindrical valve support, the upper portion of which is shaped to form a funnel-like seat for the ball S*p* of the valve. The black arrow indicates the direction of intermittent electrolyte flow, with the electrolyte lifting the valve ball from its seat against the action of gravity upon the occurrence of a slight excess pressure.

FIG. 4*b* shows a similar device which may be fitted into such apertures to serve as a valve. In this case, too, H*d* is a cylindrical valve seat, the top of which is closed by a cover lid D*e*. By means of a spring F having one end attached to the cover lid and having the other end secured to the valve seat H*d*, this cover lid is continuously drawn towards the valve seat to engage the same. Upon the occurrence of a pressure impact acting in the direction of the arrow as indicated, this cover lid is, however, pushed upwardly, thus opening the aperture to allow the electrolyte to flow.

FIG. 4*c* shows a device wherein the cross sectional area of the aperture which controls the electrolyte flow is varied by rotating sector disks $S_1$ and $S_2$ with respect to each other. Sector disk $S_1$ is rigidly connected with valve seats H*s*, whereas sector disk $S_2$ is adapted to be rotated about 90° by means of control shaft W, whereby the two sector disks alternatingly either block the entire cross sectional area or open part thereof for electrolyte flow. In such an arrangement, the apertures are opened in synchronism by a common shaft to provide for intermittent electrolyte flow.

Figure 4D:
FIG. 4d shows a horizontal sectional view of the sector disk $S_1$ of FIG. 4c, taken along the line 1–2 thereof.

FIG. 4*d* illustrates a horizontal cross sectional view of sector disk $S_1$ taken along line 1–2 of FIG. 4*c*.

Figure 5A:
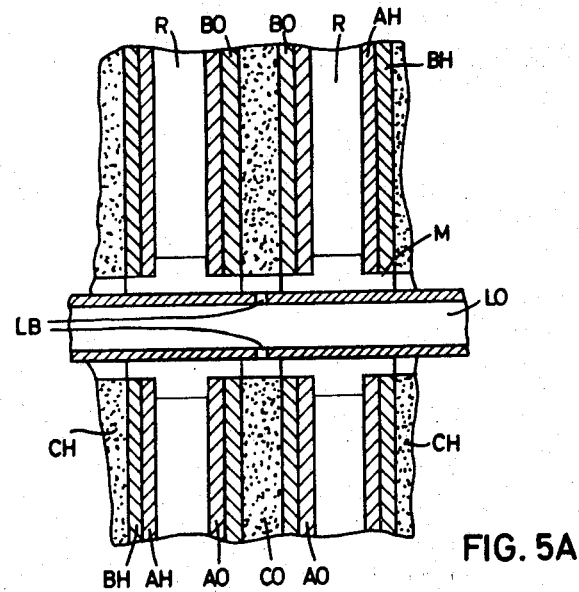
FIGS. 5a and 5b show partial sectional views of FIGS. 3b and 3c, respectively, illustrating the portions surrounding M.
Figure 5B:
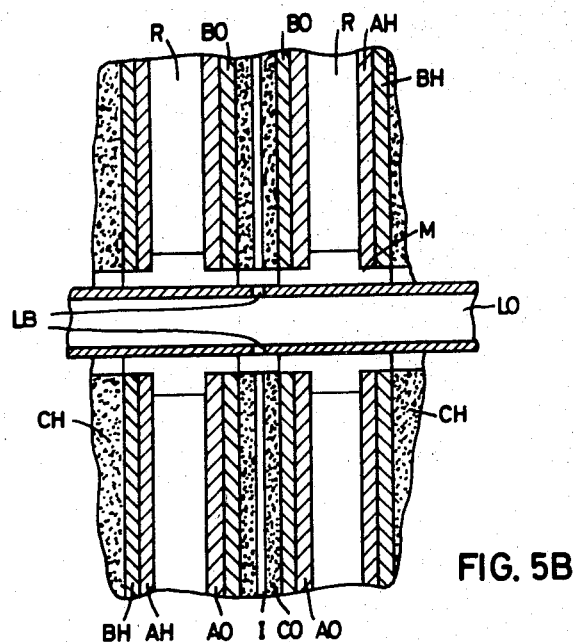

FIG. 5*a* shows a partial sectional view of FIG. 3*b* taken in the general vicinity of M. Reference figures AH, BH and CH indicate the cover layer and the operational and gas-conducting layers of the hydrogen electrodes, respectively. AO, BO and CO are the corresponding layers of the oxygen electrodes. M designates sealing sleeves fitted upon the oxygen duct LO and permitting the oxygen duct to be passed through the electrodes in a gastight manner. The oxygen duct LO is provided with bores LB at the areas within the oxygen electrode only, so that the gaseous oxygen may enter from the duct LO into the gas-conducting layer CO and from thence into BO. In a similar manner, FIG. 5*b* shows a partial sectional view of FIG. 3*c* also taken in the general vicinity of M. The oxygen electrode is divided into two electrically separated portions by the insulating layer I.

It is to be understood that the present invention is particularly applicable to any two-way operation gas diffusion electrodes which are generally disk-shaped or plate-shaped, regardless of the material of which they are made. The electrodes may be double skeleton catalyst electrodes. In this case, at least one of the two operational layers consists of an electronically conducting supporting skeleton comprising embedded Raney metal grains. The present invention is also applicable to electrodes which are sintered from coarse and fine nickel powder. Furthermore, the electrodes may also be diffusion electrodes that have been treated to be moisture-repellent.

Gas diffusion electrodes according to the invention are applicable in electro-chemical cells of any type and are particularly favorable for fuel elements and electrolysis cells. The shape and number of the openings can be chosen in dependence upon the particular design and requirements of the cell or battery. In each case, such openings afford a considerable simplification in over-all design as well as an increase in power output per unit weight.

To those skilled in the art it will be obvious upon studying this disclosure that my invention permits of various modifications other than particularly illustrated and described herein, without departing from the essential features of my invention and within the scope of the claims annexed hereto.

I claim:

1. A gas diffusion electrode for electro-chemical cells, comprising an electrode body having a coarse-porous and gas-permeable inner layer and having fine-porous cover layers joined with said inner layer and forming respective opposite electrode surfaces to be contacted by electrolyte, said body having openings traversing said body from one to the other electrode surface, sealing means on the wall of said opening for hermetically sealing said opening, said sealing means having an opening at the location of said gas-permeable coarse inner layer.

2. In an electro-chemical cell having a container, with means for passing electrolyte through said container and a plurality of gas-diffusion electrodes in said container to be immersed in the electrolyte, each of said electrodes comprising a gas-permeable coarse-porous inner layer and fine-porous cover layers superimposed upon said inner layer and forming respective opposite electrode surfaces to be contacted by the electrolyte, each electrode having at least two openings extending transversely through the electrode between said surfaces, sealing means on the wall of said opening for hermetically sealing said opening, one of said openings in one of said electrodes being offset from those in the adjacent electrode so that said openings in the totality of said electrodes jointly define a meander travel path for the flow of electrolyte in said container, the sealing means having an opening at the gas-permeable coarse inner layer.

3. In an electro-chemical cell having a container, with means for passing electrolyte through said container and a plurality of gas-diffusion electrodes in said container to be immersed in the electrolyte, each of said electrodes comprising a gas-permeable coarse-porous inner layer and fine-porous cover layers on said inner layer and forming respective opposite electrode surfaces to be contacted by the electrolyte, each electrode having at least one opening extending transversely through the electrode between said surfaces, sealing means on the wall of said opening for hermetically sealing said opening, valve means normally restricting said respective openings and responsive to increase in electrolyte pressure to temporarily release said openings.

4. In an electro-chemical cell having a container, with means for passing electrolyte through said container and a plurality of gas-diffusion electrodes in said container to be immersed in the electrolyte, each of said electrodes comprising a gas-permeable coarse-porous inner layer and fine-porous cover layers on said inner layer and forming respective opposite electrode surfaces to be contacted by the electrolyte, each electrode having at least one opening extending transversely through the electrode between said surfaces, sealing means on the wall of said opening for hermetically sealing said opening, and a gas supply line extending through said openings of a plurality of adjacent electrodes and communicating with respective gas-permeable inner layers of said electrodes.

5. In an electro-chemical cell having a container, with means for passing electrolyte through said container and a plurality of gas-diffusion electrodes in said container to be immersed in the electrolyte, each of said electrodes comprising a gas-permeable coarse-porous inner layer and fine-porous cover layers superimposed upon said inner layer and forming respective opposite electrode surfaces to be contacted by the electrolyte, each electrode having at least one opening extending transversely through the electrode between said surfaces, sealing means on the wall of said opening for hermetically sealing said opening, and electric conductor means extending through said openings of a plurality of said electrodes and electrically connecting said electrodes with each other.

6. In an electro-chemical cell having a container, with means for passing electrolyte through said container and a plurality of gas-diffusion electrodes in said container to be immersed in the electrolyte, each of said electrodes comprising a gas-permeable coarse-porous inner layer and fine-porous cover layers on said inner layer and forming respective opposite electrode surfaces to be contacted by the electrolyte, each electrode having a plurality of openings each extending transversely between said surfaces, sealing means on the wall of each of said openings for hermetically sealing said openings, electric connecting leads and gas supply means extending through said openings and interconnecting said electrodes as to gas supply and electrical power respectively, said openings being all confined to a middle area of said electrodes so as to leave a marginal zone of each electrode free of electrical and gas connections as well as of electrolyte passages through said openings.

References Cited

UNITED STATES PATENTS

| | | | |
|---|---|---|---|
| 409,365 | 8/1889 | Mond | 136—86 |
| 3,002,039 | 9/1961 | Bacon | 136—86 |
| 3,126,302 | 3/1964 | Drushella | 136—86 |
| 2,890,259 | 6/1959 | Weininger | 136—86 |
| 2,914,596 | 11/1959 | Gorin et al. | 136—86 |
| 2,947,797 | 8/1960 | Justi et al. | 136—86 |
| 2,969,315 | 1/1961 | Bacon | 136—86 |

FOREIGN PATENTS 142,470    7/1903    Germany.

WINSTON A. DOUGLAS, *Primary Examiner.*

H. FEELEY, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,404,038            October 1, 1968

August Winsel

It is certified that error appears in the above identified patent and that said Letters Patent are hereby corrected as shown below:

In the heading to the printed specification, line 11, "S 38213" should read -- A 38213 --.

Signed and sealed this 3rd day of March 1970.

(SEAL)
Attest:

Edward M. Fletcher, Jr.          WILLIAM E. SCHUYLER, JR.
Attesting Officer                 Commissioner of Patents